United States Patent
Ramberg (10) Patent No.: US 8,949,155 B2
(45) Date of Patent: Feb. 3, 2015

(54) PROTECTING PRIVACY OF PERSONALLY IDENTIFYING INFORMATION WHEN DELIVERING TARGETED ASSETS

(75) Inventor: Erik Ramberg, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1541 days.

(21) Appl. No.: 12/347,758

(22) Filed: Dec. 31, 2008

(65) Prior Publication Data

US 2010/0169224 A1 Jul. 1, 2010

(51) Int. Cl.
*G06Q 99/00* (2006.01)
*G06Q 30/00* (2012.01)
*G06Q 10/06* (2012.01)
*G06Q 20/38* (2012.01)
*H04L 9/32* (2006.01)
*H04L 9/08* (2006.01)

(52) U.S. Cl.
CPC ............ *G06Q 30/00* (2013.01); *G06Q 2220/12* (2013.01); *G06Q 10/06375* (2013.01); *G06Q 20/3829* (2013.01); *H04L 9/32* (2013.01); *H04L 9/0869* (2013.01); *H04L 2209/56* (2013.01); *H04L 2209/601* (2013.01)
USPC ................ 705/52; 705/50; 705/51; 705/14.4; 705/14.66

(58) Field of Classification Search
USPC .................................. 705/14.4, 14.66, 50–52
See application file for complete search history.

(56) References Cited

U.S. PATENT DOCUMENTS

| | | | | |
|---|---|---|---|---|
| 6,836,845 B1 * | 12/2004 | Lennie et al. | ................. | 713/181 |
| 7,146,329 B2 | 12/2006 | Conkwright et al. | | |
| 7,302,583 B2 * | 11/2007 | Forrest | ........................... | 713/186 |
| 7,360,251 B2 | 4/2008 | Spalink et al. | | |
| 7,747,862 B2 * | 6/2010 | Ovadia | .......................... | 713/176 |
| 2001/0049620 A1 | 12/2001 | Blasko | | |
| 2002/0082923 A1 | 6/2002 | Merriman et al. | | |
| 2004/0228360 A1 * | 11/2004 | Bae et al. | ...................... | 370/432 |
| 2007/0261072 A1 | 11/2007 | Boulet et al. | | |
| 2008/0040226 A1 | 2/2008 | Roker | | |
| 2008/0103903 A1 | 5/2008 | Flake et al. | | |
| 2008/0147554 A1 | 6/2008 | Stevens et al. | | |
| 2008/0259906 A1 | 10/2008 | Shkedi | | |
| 2008/0270802 A1 * | 10/2008 | Ashley et al. | ................. | 713/184 |

OTHER PUBLICATIONS

Hugo Teufel III (Chief Privacy Officer), Privacy Impact Assessment for the Automated Targeting System, U.S. Department of Homeland Security, Nov. 22, 2006, 30 pages, http://www.dhs.gov/xlibrary/assets/privacy/privacy_pia_cbp_ats.pdf.
Privacy Policy, effective May 1, 2008, http://www.tumri.com/privacy.html.

* cited by examiner

*Primary Examiner* — James D Nigh
(74) *Attorney, Agent, or Firm* — Micah Goldsmith; Judy Yee; Micky Minhas (57) ABSTRACT

Techniques are disclosed herein for protecting personally identifying information (PII) and behavioral data while delivering targeted assets. In one aspect, a profile is created based on a template and desired characteristics of users to receive one or more targeted assets. The template provides a framework for the user characteristics. One or more clients are provided the template. A manifest that identifies the targeted assets is encrypted based on the profile. The encrypted manifest is sent to the one or more clients. A user profile is generated at a client based on a template. The client attempts to decrypt the encrypted manifest based on the profile created at the client. The client sends a request for any targeted assets that were identified through the attempt to decrypt the encrypted manifest.

13 Claims, 10 Drawing Sheets

FIG. 10

PROTECTING PRIVACY OF PERSONALLY IDENTIFYING INFORMATION WHEN DELIVERING TARGETED ASSETS

BACKGROUND

Providers of media content sometimes attempt to target their content at a desired audience. For example, advertisers often attempt to deliver their advertising to consumers having certain demographic or behavioral characteristics. Such providers of "targeted assets" desire to both effectively reach the target audience and to measure the effectiveness.

However, individuals value their privacy. Protecting an individual's privacy can be challenging when delivering targeted assets. For example, governments regulate and enforce privacy rights. The regulations may place restrictions on commercial access to individual's personally identifiable information (PII), behavioral data, and other relevant details, which may make it difficult to reach the target audience.

Moreover, as more individuals are aware of how their behavior is tracked and personal information is used to target them for advertising or other targeted assets, they will demand even more regulation and shun businesses that violate their notion of privacy. Thus, it is imperative for providers of targeted assets to have techniques that abide by all regulations and protect individual's privacy.

SUMMARY

Techniques are disclosed herein for protecting PII and behavioral data when delivering targeted assets. Assets, such as advertising, are delivered to a targeted audience without knowing individual PII or behavioral data. However, the targeted asset will reach the intended audience and this fact can be tracked definitively.

In one aspect, a profile is created based on a template that provides a framework for user characteristics and desired characteristics of users to receive one or more targeted assets. One or more clients are provided the template. A manifest that identifies the targeted assets is encrypted based on the profile and sent to the one or more clients.

In another aspect, a profile is generated at a client based on a template that provides a framework for user characteristics and characteristics of a user at the client. An encrypted manifest that identifies one or more targeted assets is received at the client. The received manifest has been encrypted based on the template and desired characteristics of users that are to receive the targeted assets. The client attempts to decrypt the encrypted manifest based on the profile created at the client. The client sends a request for any targeted assets that were identified through the attempt to decrypt the encrypted manifest.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
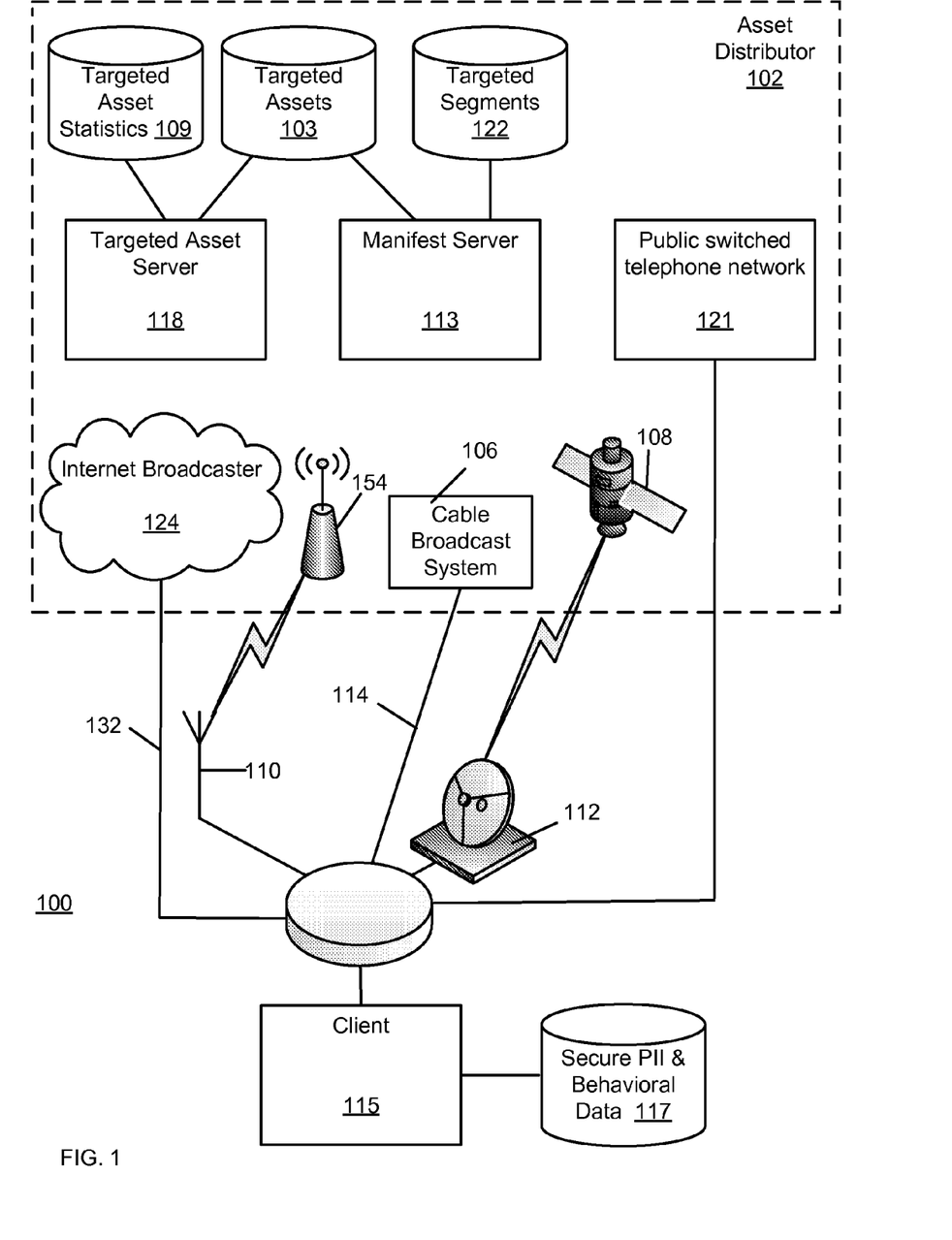
FIG. 1 depicts one embodiment of a system for providing privacy of PII and behavioral data when delivering targeted assets to a client.

FIG. 1 depicts one embodiment of a system 100 for providing privacy of PII and behavioral data when delivering targeted assets 103 to a client 115. As an example, when a user is watching a television program through a set top box (STB) at least some of the advertisements are targeted to one or more users associated with the STB. Thus, the targeted assets 103 could be advertisements; however, this is just one example. The client 115 typically also receives non-targeted assets, such as a television program and non-targeted advertisements. Significantly, the STB is not required to share any PII or behavioral data about the user at any time with any devices in the asset distributor 102.

The asset distributor 102 refers to the collection of servers and devices that provide both the targeted and the non-targeted assets to the client 115. The delivery of the non-targeted assets to the client 115 will be discussed first. The client 115 can receive the non-targeted assets through a variety of systems including, but not limited to, a cable broadcast system 106, a satellite broadcast system 108, an antenna-based broadcast system 154, and an Internet content distribution system 124. To receive the content, the client 115 is connected to a variety of mechanisms including a cable connection 114, a satellite dish 112, an antenna 110, and an Internet connection 132. Clearly, the client 115 is only required to be able to receive content from a single system or a single mechanism. Moreover, the foregoing are intended as non-limiting examples.

In some embodiments, the client 115 issues a request for targeted assets 103 after decrypting a manifest sent to it that identifies targeted assets 103. In these embodiments, the client 115 could issue this request via the cable connection 114, the Internet connection 132, or the public switched telephone network (PSTN) 121, as examples. The request may be handled by the targeted asset server 118, which sends targeted assets 103 to the client 115. The requested targeted assets 103 may be sent to the client 115 by the same mechanism by which the client 115 sent the request. However, this is not a requirement in that a different mechanism might be used. Note that there is no requirement that the targeted 103 and non-targeted assets be sent to the client 115 by the same mechanism. For some scenarios, such as when the client 115 is a STB connected to the cable broadcast system 106, the same mechanism might be used. However, if the client 115 receives the non-targeted assets from the satellite broadcast system 108, then the client 115 might use the PSTN 121 to request and receive the targeted assets 103.

After the client 115 presents a targeted asset (e.g., plays a targeted advertisement), the client 115 sends an encrypted confirmation message to, for example, the targeted asset server 118. The targeted asset server 118 updates statistics 109 that indicate that the targeted asset was presented at the client 115.

Examples of different components that can be used to implement the client 115 include, but are not limited to, a set top box (STB), television or radio receiver, personal computer, video cassette recorder (VCR), cellular telephone, video game system, video game and entertainment system, etc. An example of a video game system is the XBOX® video game system, which is provided by Microsoft Corporation of Redmond, Wash. An example of a video game and entertainment system is the XBOX 360® video game and entertainment system, which is also provided by Microsoft Corporation of Redmond, Wash.

Note that the client 115 can be connected to other clients (not depicted in FIG. 1). For example, a STB can be connected to a personal computer to allow the personal computer to play television.

The client 115 has access to secure PII and behavioral data 117 ("characteristic data"). The characteristic data 117 describes characteristics of one or more users associated with the client 115. These characteristics are used to determine whether a particular targeted asset 103 should be provided to the client 115. In one aspect, the characteristic data 117 is generated by the client 115 based on a template that is provided by the manifest server 113. Because the client 115 generates the characteristic data 117 and is not required to provide the characteristic data 117 to any device in the asset distributor 102, privacy of the user's PII and behavioral data is preserved. Also note that the client 115 may encrypt the characteristic data 117 for added security. The client 115 may use techniques other than encryption to provide security.

The characteristic data 117 may include psychographic information, demographic information, purchasing history, and viewing history, for example. Psychographic information may describe, but is not limited to, an individual's lifestyle, attitudes, beliefs, values, personality, buying motives, and/or extent of product usage. Demographic information may include, but is not limited to, age, income, occupation, educational attainment, home ownership, employment status, and geographic information such as place of residence or work. The characteristic data 117 may be derived from events that occur at the client 115. For example, purchases made through the client 115 may be tracked. However, it is possible to derive the characteristic data 117 from a source external to the client 115. One such example is a scenario in which the client 115 is networked to other devices within the home. For example, if a user makes an online purchase using their personal computer, this information can be securely provided over the home network to a STB. However, note that no PII or behavioral data is sent outside of the user's home. Some of the characteristic data 117 may be inferred. As an example, psychographic data can be inferred from a consumer's behavior. In one embodiment, a user provides information that can be used to derive characteristic data 117 such as psychographic data under the condition that the information will remain private. For example, the user might be provided with an incentive to provide information (e.g., survey questions) that can be securely stored in the characteristic data 117 and never leave the user's home. Note that in the foregoing example, the client 115 could be considered to be made up of multiple networked devices in the home.

In one embodiment information from outside the home can be used for characteristic data 117. For example, a server could provide data such as purchasing information to the client 115. As a specific example, the server could have access to credit card purchases made by the user. This information may be securely transmitted to the client 115. As non-limiting examples Secure Sockets Layer (SSL) or Transport Layer Security (TLS) may be used to securely transmit the information to the client 115. Note that this PII or behavioral data at the server is information that is already known at that server and that the PII and/or behavioral data is not provided to any entity or device other than the client 115. Thus, the privacy of the user's PII and behavioral data is protected.

The manifest server 113 has access to targeted segments 122, which define the characteristics of a user for which a targeted asset 103 should be delivered. For example, a targeted segment 122 might target users that reside within a certain range of zip codes and that have made one or more purchases of a product in a given category. Another targeted segment 122 might target users that watch sports, such that sports related advertising might be delivered even if the user is not presently watching sports. Note that the targeted segments 122 in no way contain any PII or an individual's behavioral data. Thus, the manifest server 113 does not have access to any PII or behavioral data. However, as will be clear from the discussion below, the asset distributor 102 is able to provide targeted assets 103 to the client 115 without any PII or behavioral data about users of the client 115. Moreover, the fact that the targeted assets 103 were delivered to the intended target audience may be tracked without knowledge of any PII or behavioral data.

While the foregoing has provided an example in which the targeted assets 103 are delivered to a STB or the like that plays television, there are many other examples of targeted assets 103. The targeted assets 103 might be advertisements or other information that are presented along with search results that are presented to a user performing an Internet search (or other search). The targeted assets 103 could also be advertisements or other information that is presented on a web page in response to a user request for the web page.

Figure 2:
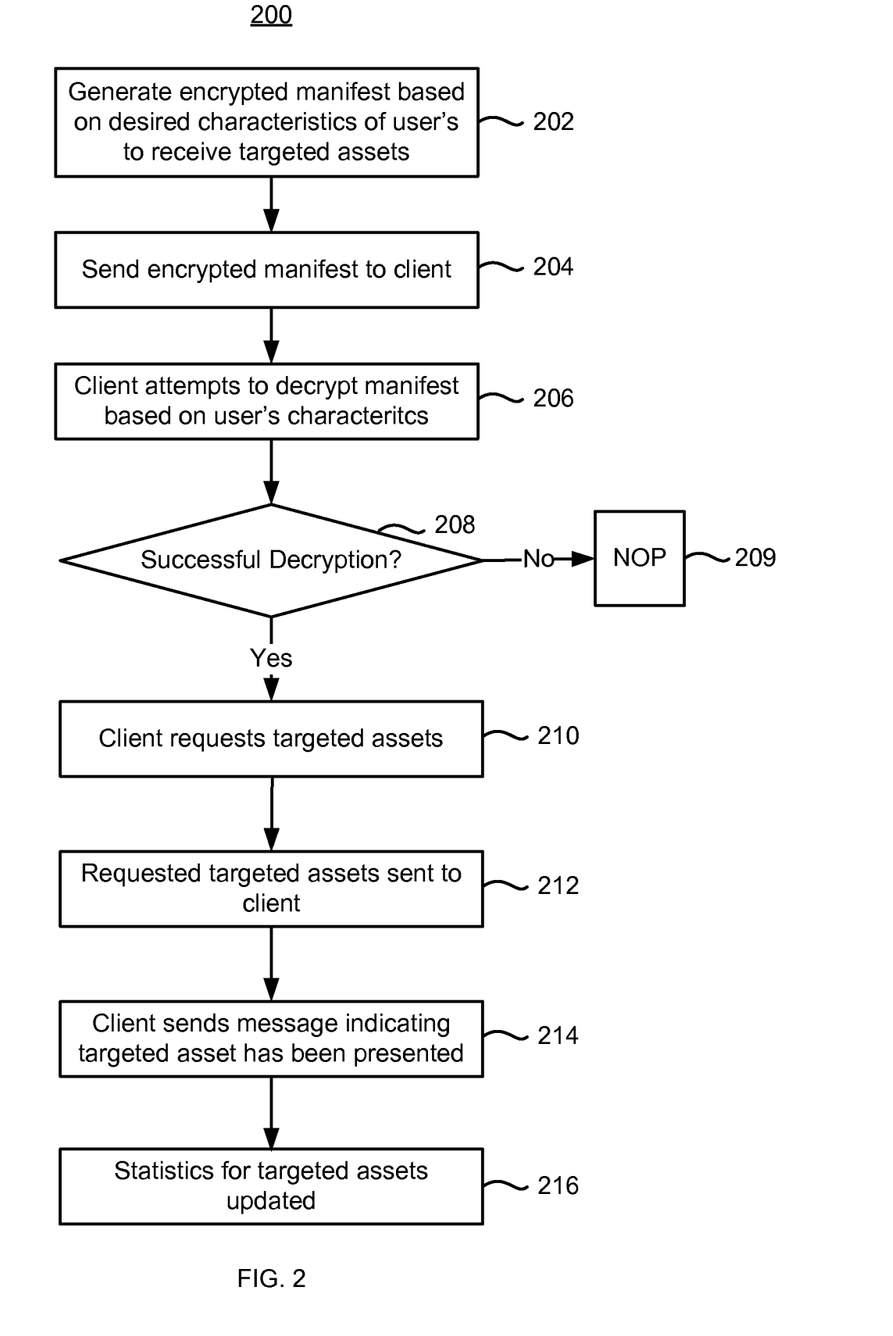
FIG. 2 is a flowchart illustrating one embodiment of a process for providing privacy for PII and behavioral data when delivering targeted assets.

FIG. 2 depicts one embodiment of a process 200 for providing privacy for PII and behavioral data when delivering targeted assets 103. Reference numerals from FIG. 1 will be used to help describe process 200; however, process 200 is not limited to the system 100 of FIG. 1. As the following discussion indicates, different portions of process 200 are typically implemented by different computing devices in system 100.

In step 202, the manifest server 113 generates an encrypted manifest. The encryption is performed based on desired characteristics of users that are to receive the targeted assets 103. The manifest is encrypted in such a way that the client 115 will only be able to decrypt the portions that identify targeted assets 103 that are intended for the user at the client 115. In one embodiment, the encryption is based on the targeted segments 122. In other words, the targeted segments 122 define the desired user characteristics. In one embodiment, the manifest is divided into separate portions that correspond to one or more targeted assets 103 that have been encrypted in a particular manner. For example, each portion is encrypted based on a different targeted segment 122.

The manifest has encrypted asset identifiers that identify all of the available targeted assets 103 that could potentially be served to the client 115. The identification of the targeted asset 103 informs client 115 how to obtain the assets 103. The manifest may also include rules for presenting the targeted assets 103 at the client 115. For example, the rules may provide instructions for how and when to insert the targeted asset 103 into a stream of non-targeted assets, as well as which targeted asset 103 should be inserted. As one particular example, the rules might specify how and when to insert an advertisement into a certain television program. As another example, a rule could instruct the client 115 to look for a certain code or other signal in the stream on non-targeted assets that indicates that a targeted asset 103 is to be inserted. The rules for inserting targeted assets could be implemented in many other ways.

In step 204, the encrypted manifest is sent to the client 115. Note that the manifest can be sent to the client 115 at a variety of different times with respect to when the non-targeted assets are being presented at the client 115. For example, at some point an initial manifest is sent to the client 115, then updates are sent whenever changes are made to the targeted assets 103, the rules for presenting the targeted assets 103, or the targeted segment 122 to which the assets 103 are targeted. However, the manifest might be sent based on other factors, such as periodically (e.g., hourly, daily, weekly, etc.) or based on actions at the client 115 (e.g., turning on the client 115, changing channels, tuning into a specific program, etc.). The manifest might also be sent shortly before a particular asset 103 is to be presented at the client 115, such that the client 115 receives the manifest "just-in-time." In one aspect, the client 115 requests the manifest. Also note that it is not important that all of the clients 115 have the same manifest at the same time (or any time).

In step 206, the client 115 attempts to decrypt the manifest. The client 115 uses a decryption technique that only allows the client 115 to decrypt the information for the targeted assets 103 that are to be displayed at the client 115. The client 115 decrypts the manifest using the same process by which the manifest was encrypted (the client 115 may reverse the encryption process as is known by those of ordinary skill in the art). In one embodiment, the decryption is based on the characteristic data 117 at the client 115. Thus, the decryption is based on characteristic about one or more users at the client 115. Recall that the characteristic data 117 and the targeted segments 122 may be based on the same template. The net result is that if the user at the client 115 has the desired characteristics that are in the targeted segment 122 upon which encryption was based, then the decryption succeeds. As previously discussed, different portions of the manifest may be encrypted based on different targeted segments 122. The client 115 knows the length of each portion of the manifest and thus makes one or more decryption attempts.

If decryption of any portion of the manifest was successful (step 208), then in step 210 the client 115 request the one or more targeted assets 103 that are identified in each decrypted portion. The client 115 may issue the request to the targeted asset server 118. The request may itself be encrypted for privacy. In one embodiment, the client 115 simply sends the encrypted portion(s) of the manifest. However, a different encryption technique could be used in the request. If no portion of the manifest is successfully decrypted, then process 200 ends in step 209.

In step 212, the targeted asset server 118 transfers the targeted assets 103 to the client 115. The targeted asset server 118 might transfer all of the targeted assets 103 at one time, such that the client 115 stores them until it is time to present them. However, the targeted assets 103 could also be delivered at a later point in time. The targeted assets 103 can be encrypted prior to transfer to the client 115 to prevent snooping. In one embodiment, the same key that was used to encrypt the portion of the manifest that identified the asset is used to encrypt the asset itself.

In step 214, the client 115 sends a message to the targeted asset server 118 to indicate that the targeted asset has been presented at the client 115. This message may be encrypted for privacy. In one embodiment, the message is encrypted using the same techniques as previous transactions. For example, the same key that was used to encrypt the portion of the manifest that identified the asset is used to encrypt the message. However, a different encryption technique may be used.

In step 216, statistics for the targeted assets 103 are updated by the targeted asset server 118. Thus, the fact that certain targeted assets 103 were presented at a client 115 may be tracked such that it is known that they being presented to a desired audience; however, neither PII nor behavioral data is tracked at the manifest server 113 or the targeted asset server 118 (or any other device at the asset distributor 102). The fact that the targeted assets 103 were delivered to the client 115 may also be tracked such that a determination can be made as to whether there are discrepancies. The client 115 may track PII and behavioral data, but this information is not required to be shared with other devices in the system 100. Also note that the client 115 does not know what assets 103 are targeted at what segment 122. Further, note that the client profile can be updated by sending a new template to the client 115 to ensure future targeting needs.

Figure 3:
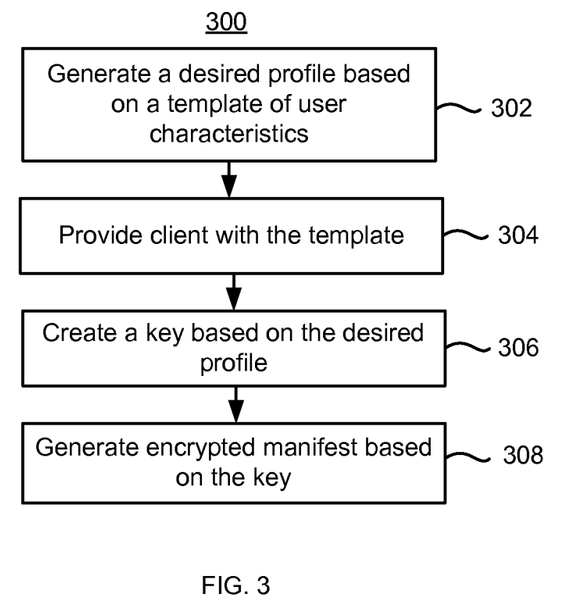
FIG. 3 is a flowchart illustrating one embodiment of a process for generating an encrypted manifest.

FIG. 3 is a flowchart illustrating one embodiment of a process 300 for generating a manifest. Process 300 may be performed by the manifest server 113. In general, process 300 is one implementation of step 202 of process 200. In step 302, a desired profile is generated based on a template of user characteristics. The desired profile may also be referred to as a targeted segment 122. The template defines how to format and organize the user characteristics such that both the manifest server 113 and the client 115 will create the same data structure if the same user characteristics are used. As previously stated, the user characteristics can include but not limited to, demographic data, purchasing data, and viewing history. Thus, the template might have a field for zip code, as an example of demographic data. With respect to purchasing data the template might break down the information into different types of purchases (e.g., type of product or service, amount, etc.). With respect to viewing history the template might have fields for amount or percentage of time viewing different types of programs (e.g., sports, news, horror films), specific channels, etc. There is no limit as to how the data might be organized. However, note that the template allows both the manifest server 113 and the client 115 to organize and format the user characteristics in the same manner.

In step 304, the client 115 is provided with the template 510. Note this is just the template and not the filled in version. The manifest server 113 does not send the filled in template to the client 115. The template can be provided to the client 115 at any time.

Figure 5:
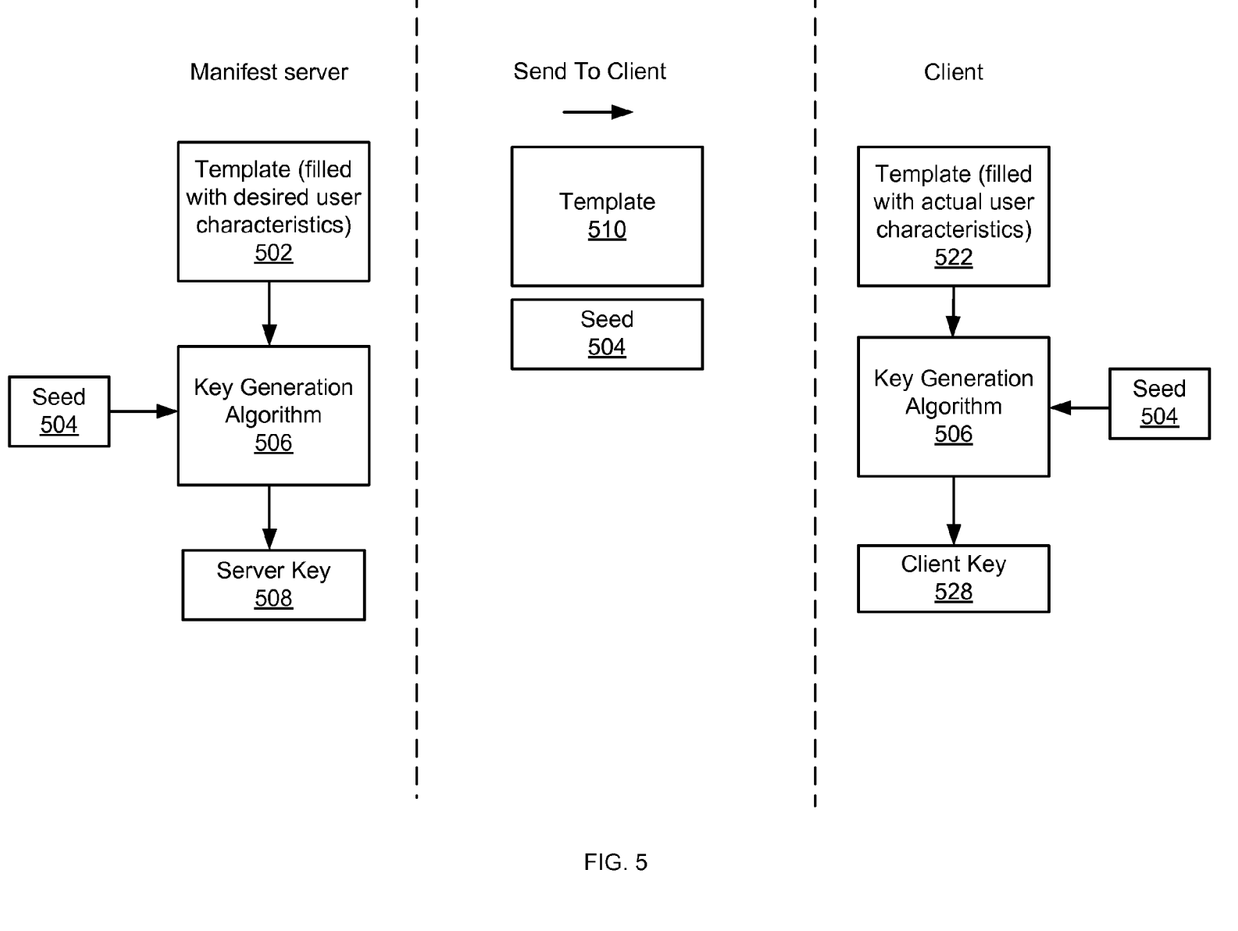
FIG. 5 is a block diagram illustrating one embodiment of key generation.

In step 306, the manifest server 113 generates a server key based on the profile. FIG. 5 depicts a block diagram of one embodiment of key generation. The diagram depicts key generation at both the manifest server 113 and the client 115. Presently, the discussion will focus on key generation at the manifest server 113. In the embodiment of FIG. 5, key generation involves generating a seed value 504. The seed 504 may be a randomly generated value. A key generation algorithm 506 is applied to the filled in template 502 using the seed 504 to generate the server key 508. The seed value 504 may be provided to the client 115. Many key generation algorithms are known in the art. The Data Encryption Standard (DES) and the Advanced Encryption Standard (AES) are two example standards that define key generation. Note that the technique to generate the final server key 508 may depend on whether encryption is for a stream cipher or a block cipher. Also note that to arrive at the server key 508 manipulations such as altering the length of the key may be performed such that the key length is appropriate for the type of encryption. Such manipulations are known to those of ordinary skill in the art.

In step 308, the manifest is encrypted based on the server key 508. The encryption may use either a stream cipher or a block cipher. In general, a stream cipher produces a continuous stream of encrypted bits. In contrast, a block cipher takes a number of bits of the manifest and encrypts them as a single unit.

Figure 4:
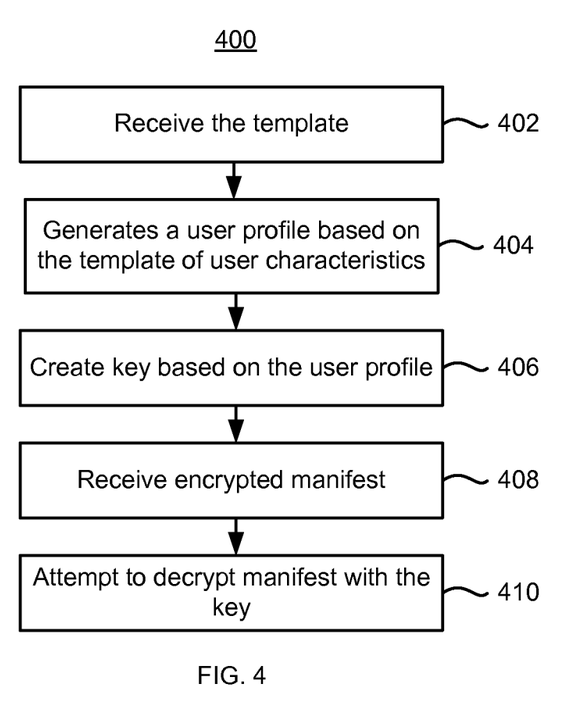
FIG. 4 is a flowchart illustrating one embodiment of a process for decrypting an encrypted manifest.

FIG. 4 is a flowchart illustrating one embodiment of a process 400 for decrypting a manifest. Process 400 may be performed by the client 115. In general, process 400 is one implementation of step 204 of process 200. In step 402, the client 115 receives the template 510.

In step 404, a user profile 522 of user characteristics is generated based on the template 510. The client 115 may create this profile over time based on information that is collected on an ongoing basis. As has already been discussed, this might include purchases made at the client 115, as well as viewing behavior at the client 115. Moreover, as already discussed the information can be collected from a device other than the client 115.

In step 406, a key 526 ("client key") is generated based on the user profile 522. FIG. 5 will be referred to again to discuss key generation at the client 115. The client 115 may use the same key generation algorithm 506 that the manifest server 113 used. The client 115 may also use the seed value 504 that was provided by the manifest server 113. Based on the user profile 522 and the seed 504, the key generation algorithm 506 is used to create the client key 528. In some embodiments, the server key 508 and the client key 528 are symmetric keys.

In step 408, the client 115 receives the encrypted manifest from the sever 113. In step 410, the client 115 attempts to decrypt the manifest based on the client key 528.

Figure 6:
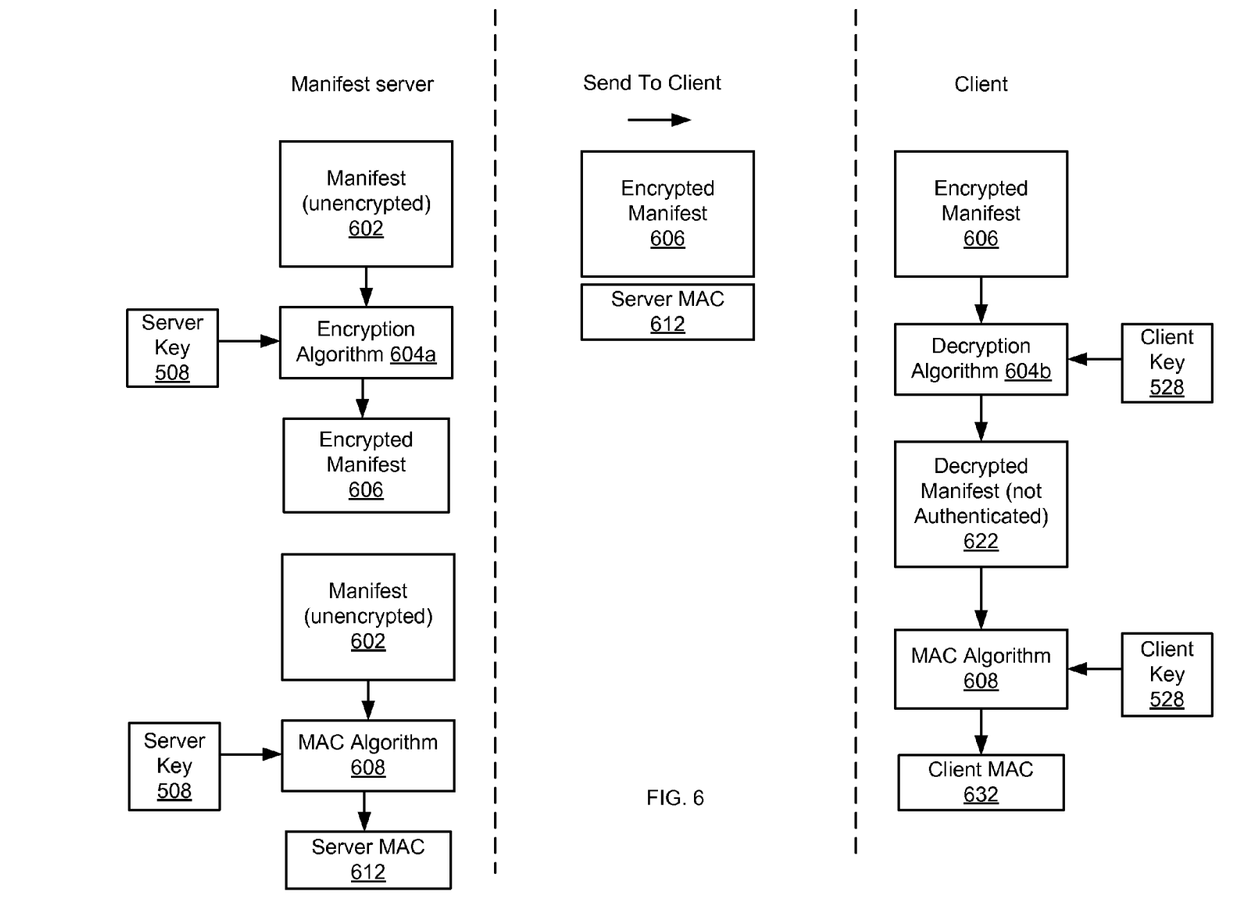
FIG. 6 is a block diagram illustrating one embodiment of verifying a decrypted manifest.

FIG. 6 is a block diagram illustrating one embodiment of a determining whether or not the attempt to decrypt the manifest was successful. FIG. 6 provides further details for step 208 of process 200 of FIG. 2. FIG. 6 depicts an overview of the server 113 encrypting the manifest and creating a message authentication code (MAC), which are both sent to the client 115. FIG. 6 also shows an overview of the client 115 reversing the process of the server 113 to attempt to decrypt the manifest and to determine whether or not the attempt was successful. The client 115 uses the MAC to determine whether the decryption of the manifest was successful.

The manifest server 113 uses an encryption algorithm 604a and the server key 508 to encrypt the manifest 602. The previously mentioned Data Encryption Standard (DES) and Advanced Encryption Standard (AES) provide examples of suitable encryption algorithms. The manifest server 113 uses the MAC algorithm 608 and the server key 508 to generate a server MAC 612 from the unencrypted manifest 602. The MAC algorithm 608 can be based on a cryptographic hash function, universal hashing, a block cipher algorithm, or another technique. The MAC algorithm 608 may be somewhat like a digital signature that is used by a recipient of an encrypted message to verify that the message originated from the claimed sender. However, for MAC algorithms 608 the sender and recipient typically use the same key, whereas for digital signatures different keys may be used by the sender and recipient. The manifest server 113 sends both the encrypted manifest 606 and the server MAC 612 to the client 115.

The client 115 uses a decryption algorithm 604b and the client key 528 to attempt to decrypt the encrypted manifest 606. The decryption algorithm 604b is a counterpart to the encryption algorithm 604a used by the manifest server 113. The result is a decrypted (but not authenticated) manifest 622. The client 115 then applies the MAC algorithm 608 to the unauthenticated manifest 622, using the client key 528, to generate a client MAC 632. If the client MAC 632 matches the server MAC 612, then decryption of the manifest was successful. If the two do not match, then decryption was unsuccessful.

As previously discussed, the manifest can be encrypted in different portions, each portion intended for a different target segment. Thus, the client 115 might apply the decryption and authentication to each portion of the manifest separately.

Figure 7A:
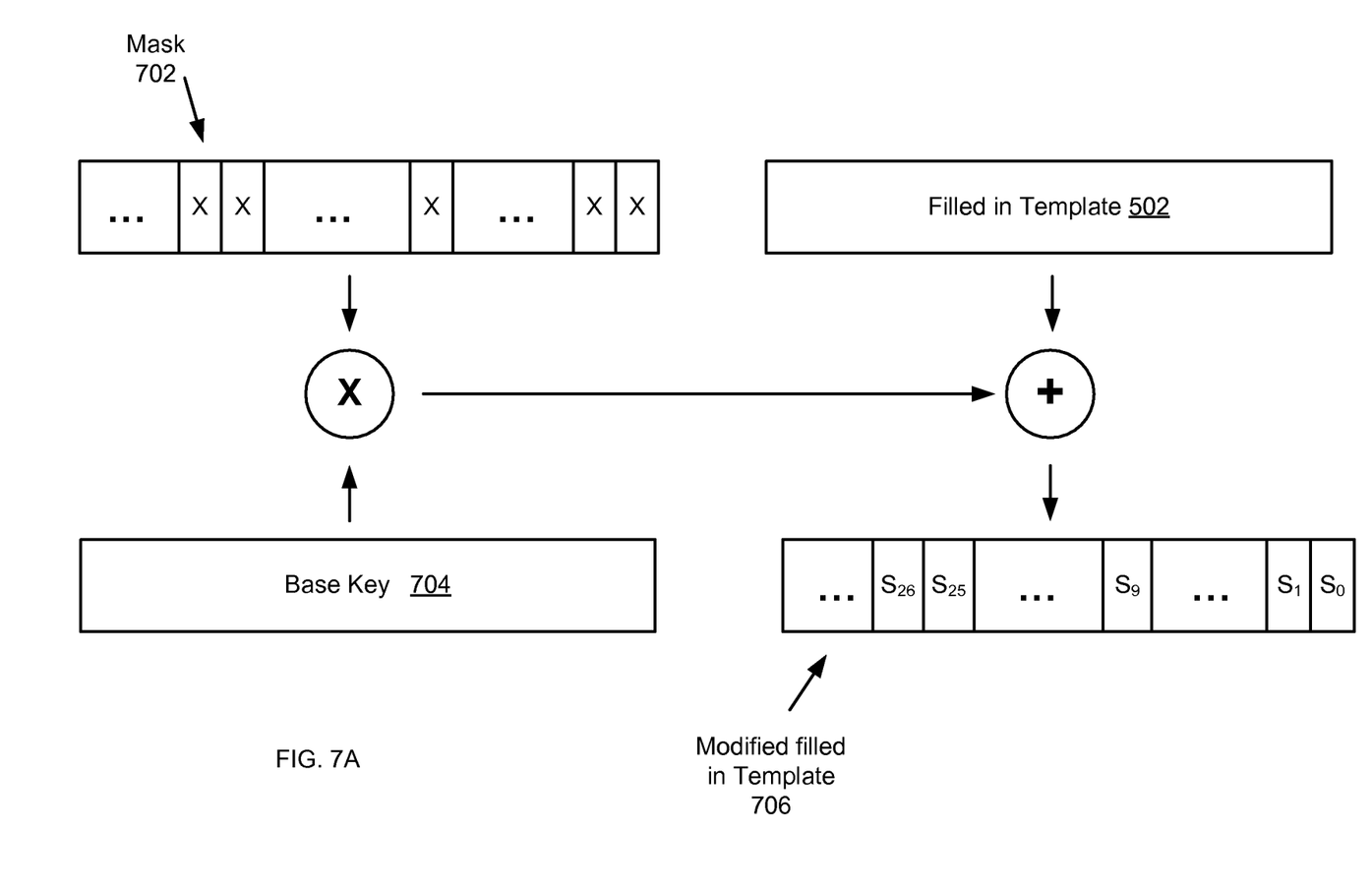
FIG. 7A is a block diagram illustrating one embodiment of masking a template at a server.

Note that in some cases it can be desirable for the targeted segment 122 to cover a range of user characteristics. For example, it might be desirable for all users in a range of zip codes to be included in a targeted segment 122. FIG. 7A is a block diagram illustrating one embodiment of masking bits to target an asset 103 to a range of user characteristics. In general, the process involves generating a modified filled in template 706 from the filled in template 502 using a mask 702 and a base key 704. The mask 702 and the base key 704 are provided to the client 115 to allow the client 115 to perform a similar process.

As a particular example, it might be desirable for all users with a zip code that begins with "941" to receive the targeted assets 103 regardless of the final two zip code digits. In essence, the last two digits become "don't care" digits. More specifically, the binary counterparts of these digits in the filled in template 502 are don't care bits. The mask 702 indicates which bits in the filled in template 502 correspond to the last two zip code digits. These bits are replaced by corresponding bits from the base key 704. FIG. 7A shows an example in which bits 0, 1, 9, 25, and 26 from the filled in template 502 are replaced by bits from the base key 704. The base key 704 may have any desired values in these bit positions. What is significant is that the base key 704 and the mask 702 are provided to the client 115 such that that client 115 may perform a similar process. After the modified filled in template 706 is generated, the manifest server 113 may create the server key 508 therefrom. This may involve using one of the aforementioned key generation algorithms 506 at the manifest sever 113.

Figure 7B:
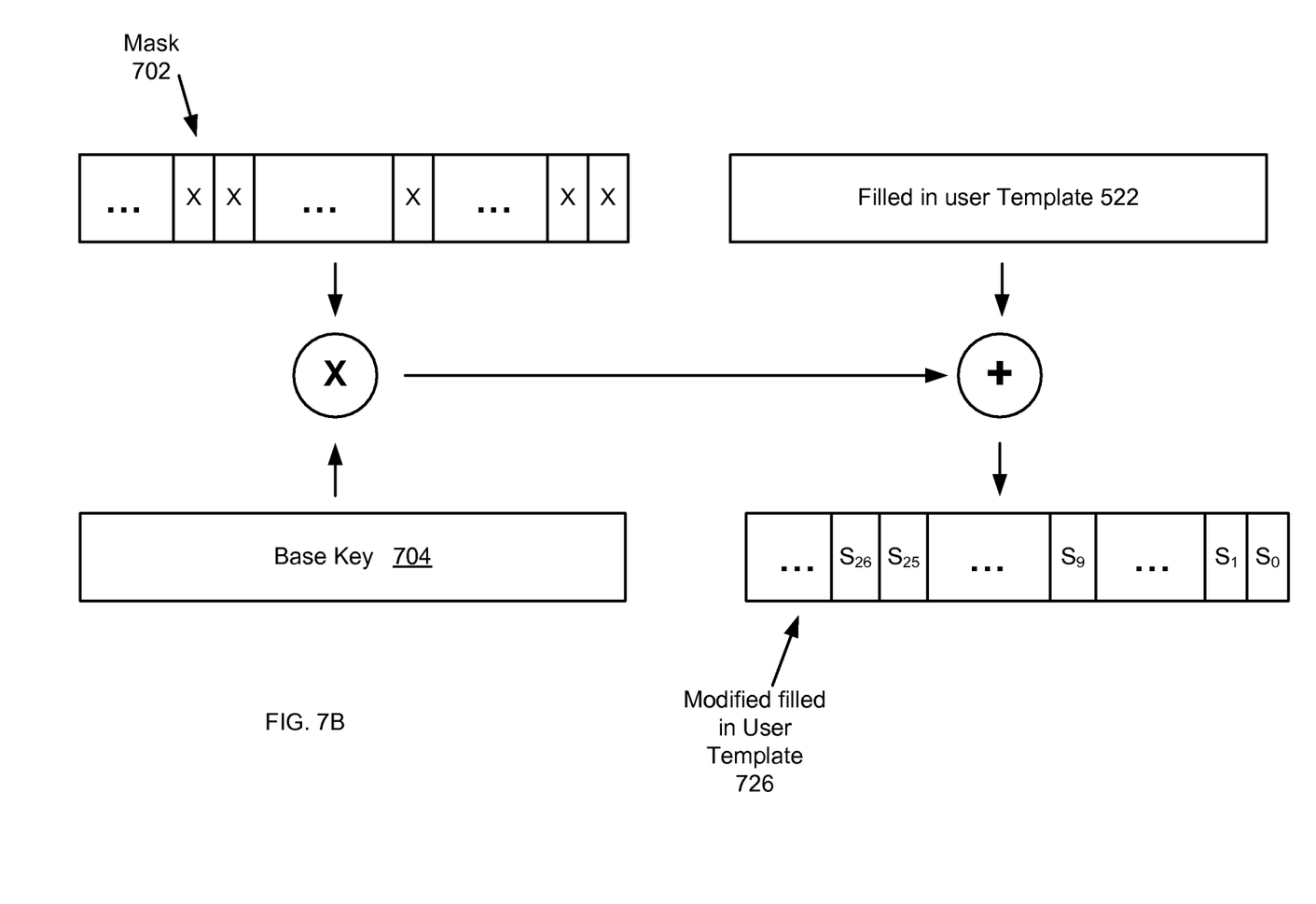
FIG. 7B is a block diagram illustrating one embodiment of masking a template at a client.

The client 115 performs a similar process as depicted in FIG. 7B. The client 115 starts with the filled in user template 522 that has been filled in according to user characteristics at the client 115. The client 115 uses the mask 702 to replace selected bits in the filled in user template 522 with bits from the base key 704, which results in the modified filled in user template 726. The client 115 then generates the user key 528 based on the modified filled in user template 726.

Continuing with the example used on the server side, the client 115 applies the mask 702 to the client created user template 522 to mask out the binary counterparts of the last two digits of the user's zip code. These bits are replaced by the corresponding bits from the static template 704 to arrive at the modified user template 706. Then, the client 115 applies a key generation algorithm 506 to the modified user template 706 that corresponds to the key generation algorithm 506 used by the manifest server 113. Thus, clients 115 with zip codes starting with "941" will be able to decrypt the manifest regardless of the last two actual zip code digits.

In various embodiments, the manifest server 113, the client 115 and/or the targeted asset server 118 execute computer readable instructions that are stored on computer readable media. For example, process 200, 300, and/or 400 may be implemented by executing, on a processor, instructions that are stored on a computer readable storage medium. Computer readable media can be any available media that can be accessed by the client 115 or server 113. By way of example, and not limitation, computer readable media may comprise computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the computer readable instructions and which can accessed by the client 115 or servers 113, 118.

Figure 8:
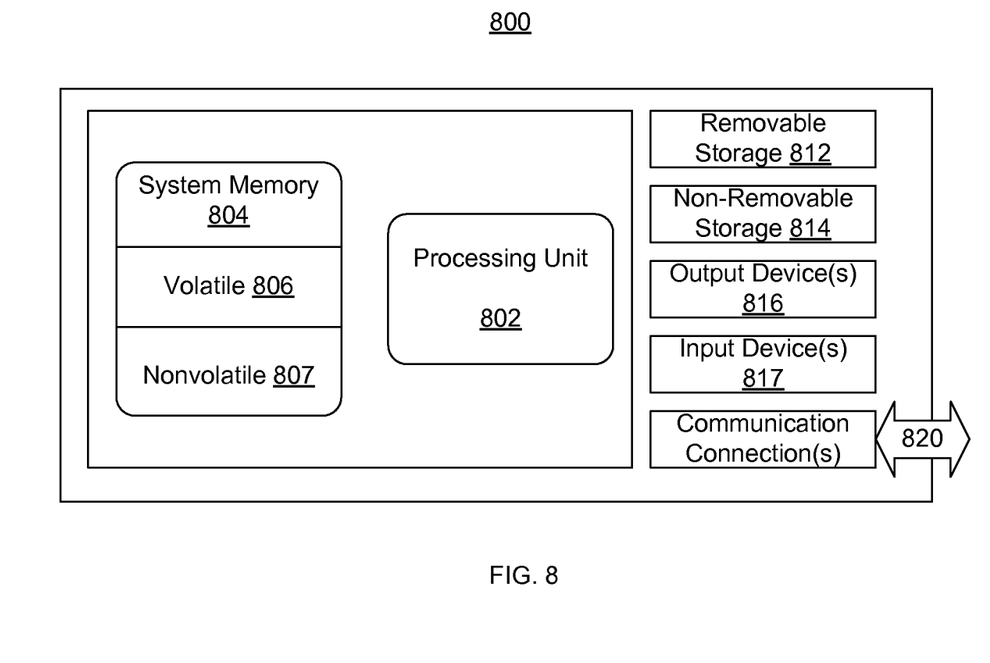
FIG. 8 depicts an example computer system that serves as a platform for embodiments of the present invention.

FIG. 8 depicts an example computer system 800 that may serve as a platform for embodiments of the present invention. The manifest server 113, the targeted asset server 118, or even the client 115 may be implemented with such a computer platform. For example, computer system 800 may serve as a platform for a STB or television. In its most basic configuration, the computer 800 typically includes a processing unit 802 and memory 804. Depending on the exact configuration and type of computing device, memory 804 may be volatile (such as RAM), non-volatile (such as ROM, flash memory, etc.) or some combination of the two. Additionally, computer 800 may also have mass storage (removable 812 and/or non-removable 814) such as magnetic or optical disks or tape. Similarly, computer 800 may also have input devices 817 and/or output devices 816. Other aspects of device 800 may include communication connections 820 to other devices, computers, networks, servers, etc. using either wired or wireless media. For example, the server 113 or 118 and the client 115 may have a network connection to each other.

Figure 9:
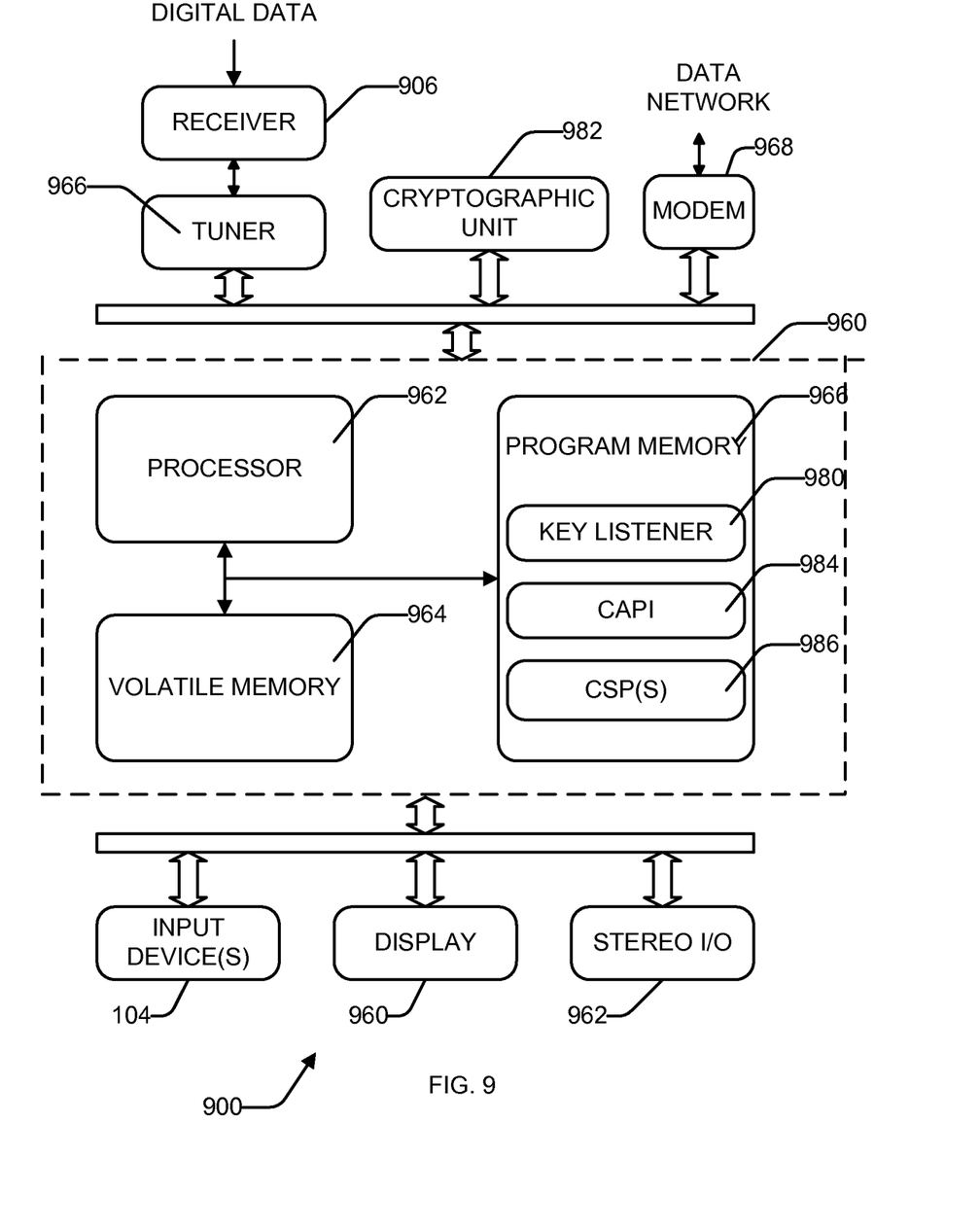
FIG. 9 shows an example configuration of a broadcast-enabled computer that serves as a platform for some embodiments of the present invention.

At least some of the embodiments disclosed herein may be implemented on client 115. FIG. 9 shows an example configuration of a broadcast-enabled electronic media device 900 that may serve to implement at least a portion of the client 115. Device 900 includes a central processing unit 960 having a processor 962, volatile memory 964 (e.g., RAM), and program memory 966 (e.g., ROM, Flash, disk drive, floppy disk drive, CD-ROM, etc.). The device 900 has one or more input devices 104 (e.g., keyboard, mouse, etc.), a video display 902 (e.g., VGA, SVGA), and a stereo I/O 972 for interfacing with a stereo system.

The device 900 includes a digital broadcast receiver 906 (e.g., satellite dish receiver, RF receiver, microwave receiver, multicast listener, etc.) and a tuner 976 which tunes to appropriate frequencies or addresses of the broadcast network. The tuner 976 is configured to receive digital broadcast data in a particularized format, such as MPEG-encoded digital video and audio data, as well as digital data in many different forms, including software programs and programming information in the form of data files. The device 900 also has a modem 978, which provides dial-up access to the data network 928 to provide a back channel or direct link to the server 113 or 118. In other implementations of a back channel, the modem 978 might be replaced by a network card, or an RF receiver, or other type of port/receiver that provides access to the back channel.

The device 900 runs an operating system that supports multiple applications. The operating system may be a multi-tasking operating system that allows simultaneous execution of multiple applications. The operating system may employ a graphical user interface windowing environment that presents the applications or documents in specially delineated areas of the display screen called "windows."

The device is illustrated with a key listener 980 to receive the authorization and session keys transmitted from the server 113 or 118. The keys received by listener 980 are used by cryptographic security services implemented in the protection mechanism 103 in the client 115 to enable decryption of the session keys and data. Cryptographic services may be implemented through a combination of hardware and software. A secure, tamper-resistant hardware unit 982 is provided external to the CPU 960 and two software layers 984, 986 executing on the processor 962 are used to facilitate access to the resources on the cryptographic hardware 982.

The software layers include a cryptographic application program interface (CAPI) 984 that provides functionality to any application seeking cryptographic services (e.g., encryption, decryption, signing, or verification). One or more cryptographic service providers (CSPs) 986 implement the functionality presented by the CAPI to the application. The CAPI layer 984 selects the appropriate CSP for performing the requested cryptographic function. The CSPs 986 perform various cryptographic functions such as encryption key management, encryption/decryption services, hashing routines, digital signing, and authentication tasks in conjunction with the cryptographic unit 982. A different CSP might be configured to handle specific functions, such as encryption, decryption, signing, etc., although a single CSP can be implemented to handle them all. The CSPs 966 can be implemented as dynamic linked libraries (DLLs) that are loaded on demand by the CAPI, and which can then be called by an application through the CAPI 984.

Figure 10:
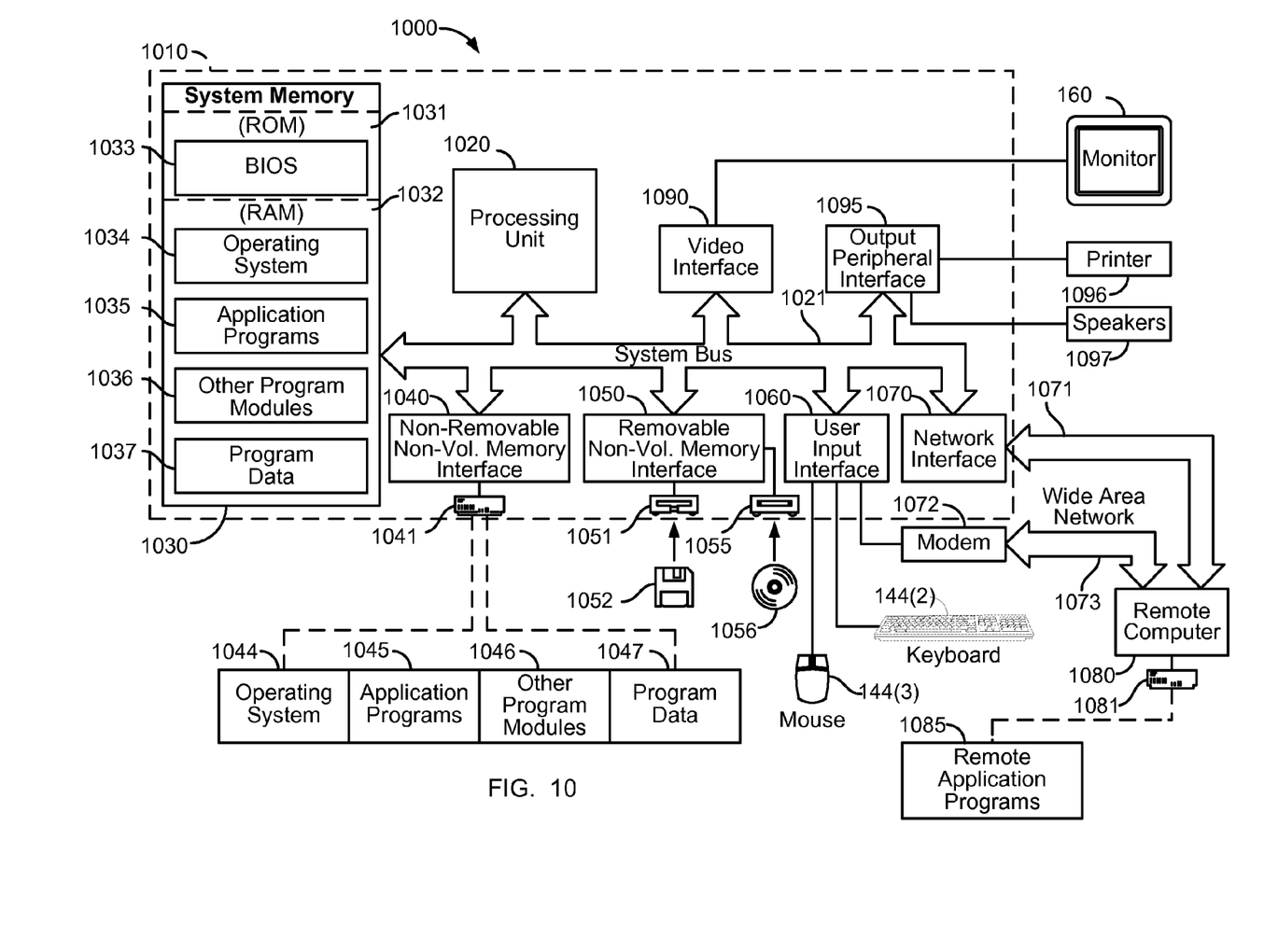
FIG. 10 shows an example configuration of a computer that serves as a platform for some embodiments of the present invention.

With reference to FIG. 10, an exemplary system for implementing some embodiments includes a general purpose computing device in the form of a computer 1010. For example, computer system 1010 may be used to implement client 115. Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory 1030 includes computer storage media in the form of volatile and/or nonvolatile memory such as ROM 1031 and RAM 1032. A basic input/output system (BIOS) 1033, containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disc drive 1041 that reads from or writes to non-removable, nonvolatile magnetic media and a magnetic disc drive 1051 that reads from or writes to a removable, nonvolatile magnetic disc 1052. Computer 1010 may further include an optical media reading device 1055 to read and/or write to an optical media.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 1041 is typically connected to the system bus 1021 through a non-removable memory interface such as interface 1040. Magnetic disc drive 1051 and optical media reading device 1055 are typically connected to the system bus 1021 by a removable memory interface, such as interface 1050.

The drives and their associated computer storage media discussed above and illustrated in FIG. 10, provide storage of computer readable instructions, data structures, program modules and other data for the computer 1010. In FIG. 10, for example, hard disc drive 1041 is illustrated as storing operating system 1044, application programs 1045, other program modules 1046, and program data 1047. These components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies.

A user may enter commands and information into the computer 1010 through input devices such as a keyboard 144(2) and a pointing device 144(3), commonly referred to as a mouse, trackball or touch pad. Other input devices (not shown) may include a microphone, joystick, game pad, satellite dish, scanner, or the like. These and other input devices are often connected to the processing unit 1020 through a user input interface 1060 that is coupled to the system bus 1021, but may be connected by other interface and bus structures, such as a parallel port, game port or a universal serial bus (USB). A monitor 160 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 may operate in a networked environment using logical connections to one or more remote computers, such as a remote computer 1080. The remote computer 1080 may be the extended device 113. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communication over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communication link between the computers may be used.

While some embodiments are implemented by executing computer readable instructions that are stored on computer readable media, this is not a requirement in all embodiments. Some embodiments may be implemented in hardware or a combination of hardware and software. For example, at least some of the steps of process 200, 300, and/or 400 may be implemented within an ASIC. As a particular example, a portion of the client 115 may be implemented with an ASIC.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A machine implemented method, the method comprising:
    providing one or more clients with a template that provides a framework for user characteristics;
    filling a copy of the template, by a server, with characteristics of users that are to receive one or more targeted assets;
    generating an encryption key based on the filled in template and a seed value;
    providing the seed value to the one or more clients;
    encrypting, at the server, a manifest that identifies the one or more targeted assets, the encrypting is performed using the encryption key; and
    sending the encrypted manifest from the server to the one or more clients.

2. A machine implemented method of claim 1, further comprising:
    generating an authentication parameter based the encryption key and the manifest; and
    sending the authentication parameter to the one or more clients.

3. A machine implemented method of claim 1, wherein the filled in template comprises bits, and further comprising:
    replacing selected bits of the bits in the filled in template based on a mask and a base key; and
    providing the mask and the base key to the one or more clients.

4. A machine implemented method of claim 1, further comprising:
    providing a first of the targeted assets to a first client of the one or more clients in response to a request from the first client;
    receiving an indication that the first targeted asset was presented at the first client; and
    updating a record that indicates that the first targeted asset was presented to a user having characteristics that match a target profile.

5. A system comprising:
    a processor; and
    a computer readable storage device coupled to the processor, the computer readable storage device having instructions stored thereon which, when executed on the processor, cause the processor to:

provide one or more clients with a template that provides a framework for user characteristics;

fill a copy of the template with characteristics of users that are to receive one or more targeted assets;

generate an encryption key based on the filled in template and a seed value;

provide the seed value to the one or more clients;

encrypt a manifest that identifies the one or more targeted assets using the encryption key; and send the encrypted manifest to the one or more clients.

6. The system of claim 5, wherein the instructions further cause the processor to:

generate an authentication parameter based the encryption key and the manifest; and send the authentication parameter to the one or more clients.

7. The system of claim 5, wherein the filled in template includes bits, wherein the instructions further cause the processor to:

replace selected bits of the bits in the filled in template based on a mask and a base key; and provide the mask and the base key to the one or more clients.

8. The system of claim 5, wherein the instructions further cause the processor to:

provide a first of the targeted assets to a first client of the one or more clients in response to a request from the first client;

receive an indication that the first targeted asset was presented at the first client; and update a record that indicates that the first targeted asset was presented to a user having characteristics that match a target profile.

9. A computer readable storage device having instructions stored thereon which, when executed on a processor, cause the processor to:

provide one or more clients with a template that provides a framework for user characteristics;

fill a copy of the template with characteristics of users that are to receive one or more targeted assets;

determine an encryption key by applying a key generation algorithm to the filled in template;

encrypt a manifest that identifies the one or more targeted assets using the encryption key; and send the encrypted manifest to the one or more clients.

10. The computer readable storage device of claim 9, wherein the instructions that cause the processor to determine an encryption key include instructions that cause the processor to use a seed to determine the encryption key, the instructions further cause the processor to:

provide the seed to the one or more clients.

11. The computer readable storage device of claim 9, wherein the instructions cause the processor to:

generate an authentication parameter based the encryption key and the manifest; and send the authentication parameter to the one or more clients.

12. The computer readable storage device of claim 9, wherein the filled in template includes bits, wherein the instructions cause the processor to:

replace selected bits of the bits in the filled in template based on a mask and a base key; and provide the mask and the base key to the one or more clients.

13. The computer readable storage device of claim 9, wherein the instructions cause the processor to:

provide a first of the targeted assets to a first client of the one or more clients in response to a request from the first client;

receive an indication that the first targeted asset was presented at the first client; and update a record that indicates that the first targeted asset was presented to a user having characteristics that match a target profile.

* * * * *